United States Patent
Woo et al.

(10) Patent No.: US 11,951,832 B2
(45) Date of Patent: Apr. 9, 2024

(54) DRIVER ASSISTANCE SYSTEM

(71) Applicants: Hyundai Motor Company, Seoul (KR); Kia Corporation, Seoul (KR)

(72) Inventors: Dong Hyeon Woo, Daegu (KR); Kyeong Keun Kim, Hwaseong-Si (KR); Min Kyu Han, Yongin-Si (KR); Da Som Yang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 62 days.

(21) Appl. No.: 17/971,034

(22) Filed: Oct. 21, 2022

(65) Prior Publication Data

US 2023/0144205 A1    May 11, 2023

(30) Foreign Application Priority Data

Nov. 5, 2021  (KR) .................. 10-2021-0151425

(51) Int. Cl.
*B60K 28/02* (2006.01)
*B60N 2/00* (2006.01)
(Continued)

(52) U.S. Cl.
CPC .............. *B60K 28/02* (2013.01); *B60N 2/002* (2013.01); *B60T 7/12* (2013.01); *B60W 10/10* (2013.01); *B60W 10/182* (2013.01); *B60W 40/08* (2013.01); *B60W 50/14* (2013.01); *B60T 2220/02* (2013.01); *B60T 2220/04* (2013.01);
(Continued)

(58) Field of Classification Search
CPC ........... B60K 28/02; B60N 2/002; B60T 7/12; B60T 2220/02; B60T 2220/04; B60T 7/042; B60W 10/10; B60W 10/182; B60W 40/08; B60W 50/14; B60W 2040/0818; B60W 2050/143; B60W 2050/146; B60W 2510/083; B60W 2510/101; B60W 2540/10; B60W 2540/12; B60W 2540/225; B60W 2540/229; B60W 2040/0881; B60W 2540/223; B60W 50/12; B60W 30/18054; B60W 50/0098; B60W 2050/0075; B60W 10/18; B60W 30/181; B60W 2040/0863; B60W 2520/04; B60W 2710/083;
(Continued)

(56) References Cited

U.S. PATENT DOCUMENTS

2020/0216044 A1* 7/2020 Chow .................. B60T 8/171
2020/0369247 A1* 11/2020 Kamiya ............... B60T 17/22

FOREIGN PATENT DOCUMENTS

JP   2009-101714 A   5/2009
KR   2021-0052610 A  5/2021

* cited by examiner

*Primary Examiner* — Omeed Alizada
(74) *Attorney, Agent, or Firm* — MORGAN, LEWIS & BOCKIUS LLP (57) ABSTRACT

A driver assistance system for vehicles, which is capable of preventing driver carelessness from causing a vehicle accident when a vehicle stops while traveling, includes a vehicle sensor unit configured to detect driver state data, a driver assistance unit operated to assist a driver when driver carelessness about vehicle driving is detected when a vehicle stops while traveling, and a control unit configured to identify whether the driver is careless based on the driver state data when the vehicle stops while traveling, and to operate the driver assistance unit when the driver carelessness is detected, preventing the vehicle from driving.

18 Claims, 3 Drawing Sheets

(51) Int. Cl.
  *B60T 7/12* (2006.01)
  *B60W 10/10* (2012.01)
  *B60W 10/18* (2012.01)
  *B60W 40/08* (2012.01)
  *B60W 50/14* (2020.01)

(52) U.S. Cl.
  CPC ............... *B60W 2040/0818* (2013.01); *B60W 2050/143* (2013.01); *B60W 2050/146* (2013.01); *B60W 2510/083* (2013.01); *B60W 2510/101* (2013.01); *B60W 2540/10* (2013.01); *B60W 2540/12* (2013.01); *B60W 2540/225* (2020.02); *B60W 2540/229* (2020.02)

(58) Field of Classification Search
  CPC .......... B60R 21/01516; B60Y 2200/91; B60Y 2400/90; B60Y 2400/92
  See application file for complete search history.

DRIVER ASSISTANCE SYSTEM

CROSS-REFERENCE TO RELATED APPLICATION

The present application claims priority to Korean Patent Application No. 10-2021-0151425 filed on Nov. 5, 2021, the entire contents of which is incorporated herein for all purposes by this reference.

BACKGROUND OF THE PRESENT DISCLOSURE

Field of the Present Disclosure

The present disclosure relates to a driver assistance system for vehicles. More, it relates to a driver assistance system for vehicles, which is capable of preventing driver carelessness from causing a vehicle accident when a vehicle stops while traveling.

Description of Related Art

Occasionally, a vehicle may temporarily stop while traveling. For example, the vehicle temporarily stops at a stop signal of a traffic light or at a toll gate on a highway to pay a toll while traveling.

A driver stops the vehicle by depressing the brake pedal thereof, and the speed of the vehicle reaches "0" (zero).

However, when the driver behaves other than driving after stopping the vehicle, the driver may unintentionally weaken a force depressing the brake pedal (i.e., a pedal effort) or may release the depressed brake pedal together with a decrease in concentration on driving.

When the pedal effort of the brake pedal is reduced or the depressed brake pedal is released with the vehicle stopped, the vehicle may move forward regardless of the intention of the driver (i.e., creep driving).

In the instant case, the driver may accidentally depress an accelerator pedal instead of the brake pedal, which may cause a forward collision accident caused by sudden acceleration of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driver assistance system for vehicles, which enables a vehicle to remain stopped by preventing driver carelessness from causing the vehicle to begin to move or to drive forward when the vehicle stops while traveling.

The present disclosure is not limited to the above-mentioned object, and other objects of the present disclosure will be clearly understood by those skilled in the art to which an exemplary embodiment of the present disclosure pertains from the following description.

In an exemplary embodiment of the present disclosure, there is provided a driver assistance system for vehicles, which includes a vehicle sensor unit configured to detect driver state data, a driver assistance unit operated to assist a driver when driver carelessness about vehicle driving is detected when a vehicle stops while traveling, and a control unit configured to identify whether the driver is careless based on the driver state data when the vehicle stops while traveling, and to operate the driver assistance unit when the driver carelessness is detected, preventing the vehicle from driving.

The control unit may classify the driver carelessness into a plurality of levels for determination based on the driver state data.

The vehicle sensor unit may include a driver gaze sensor configured to detect a gaze of the driver, a driver seat hydraulic pressure sensor configured to detect a seat hydraulic pressure of a driver seat, and a brake pedal sensor configured to detect a pedal depression amount of a brake pedal.

When the control unit concludes that the driver does not look ahead according to the driver state data obtained by the driver gaze sensor, the control unit may determine the driver carelessness as a first level.

The control unit may determine the driver carelessness as a second level when the control unit concludes that the driver does not look ahead, and when a seat hydraulic pressure obtained by the driver seat hydraulic pressure sensor is less than or equal to a predetermined critical hydraulic pressure, or when a pedal depression amount of the brake pedal obtained by the brake pedal sensor is less than or equal to a predetermined critical pedal depression amount.

The control unit may determine the driver carelessness as a third level when the control unit concludes that the driver does not look ahead, and when the seat hydraulic pressure is less than or equal to the critical hydraulic pressure, and when the pedal depression amount of the brake pedal is less than or equal to the critical pedal depression amount.

When the driver carelessness is determined as the first level, the control unit may visually warn of the driver carelessness through a display unit provided in the driver assistance unit.

When the driver carelessness is determined as the second level, the control unit may visually warn of the driver carelessness through the display unit, while audibly warning of the driver carelessness through a warning sound output unit provided in the driver assistance unit.

When the driver carelessness is determined as the third level, the control unit may operate an electric parking brake provided in the driver assistance unit.

When the driver carelessness is determined as the third level, the control unit may shift a gear shifting of a transmission, provided in the driver assistance unit, to a neutral range.

When the driver carelessness is determined as the third level, the control unit may control a vehicle drive motor provided in the driver assistance unit to have a torque of "0", in which case the vehicle is an electric vehicle using only the vehicle drive motor as a driving power source thereof.

When the driver carelessness is determined as the third level, the control unit may visually and audibly warns of the driver carelessness through a display unit and a warning sound output unit provided in the driver assistance unit.

When a vehicle speed is "0", a pedal depression amount of a brake pedal of a vehicle is greater than a predetermined critical pedal depression amount, and a gear shifting of a transmission is positioned in a drive range, the control unit may determine that the vehicle stops while traveling.

The control unit may release the operation of the driver assistance unit by determining that the vehicle is in a drivable state when the control unit concludes that a drive seat hydraulic pressure is maintained to be equal to or greater than a predetermined critical hydraulic pressure while the driver assistance unit is in operation, a pedal depression amount of an accelerator pedal is greater than a predetermined critical pedal depression amount, and the driver looks ahead.

Other aspects and exemplary embodiments of the present disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the present disclosure will be described in conjunction with exemplary embodiments of the present disclosure, it will be understood that the present description is not intended to limit the present disclosure to the exemplary embodiments of the present disclosure. On the other hand, the present disclosure is directed to cover not only the exemplary embodiments of the present disclosure, but also various alternatives, modifications, equivalents and other embodiments, which may be included within the spirit and scope of the present disclosure as defined by the appended claims.

The specific structural or functional descriptions set forth herein are only provided for describing the exemplary embodiments according to the concept of the present disclosure, and these embodiments may be implemented in different forms.

Furthermore, it will be understood herein that, when a component is referred to as "comprising or including" any component, it does not exclude other components, but can further comprise or include the other components unless otherwise specified.

Hereinafter, various exemplary embodiments of the present disclosure will be described with reference to the accompanying drawings. The items represented in the accompanying drawings may be schematically illustrated for ease of explanation of the exemplary embodiments of the present disclosure, and may be different from those implemented in practice.

Occasionally, a vehicle may temporarily stop while traveling. For example, the vehicle temporarily stops at a stop signal of a traffic light or at a toll gate on a highway to pay a toll while traveling.

In the instant case, a driver stops the vehicle by depressing the brake pedal thereof while a gear shifting of a transmission is positioned in a drive range (D range), and the speed of the vehicle speed is "0" (zero).

If the driver behaves other than driving with the vehicle stopped, the driver may weaken a force depressing the brake pedal (i.e., a pedal effort) or may release the depressed brake pedal together with a decrease in concentration on vehicle driving.

When the pedal effort of the brake pedal is reduced or the depressed brake pedal is released when the vehicle stops while traveling, the vehicle may move forward regardless of the intention of the driver.

Accordingly, various aspects of the present disclosure are directed to providing a driver assistance system and method for vehicles, which enable a vehicle to remain stopped by operating to assist a driver when the vehicle stops while traveling and the driver is in a careless state where the driver does not concentrate on vehicle driving.

The driver assistance system of the present disclosure can prevent driver carelessness from causing a vehicle to begin to move or to drive forward to allow the vehicle to remain stopped until the vehicle reaches a drivable state, by assisting a driver depending on the degree to which the driver is careless in vehicle driving after the vehicle begins to stop.

Figure 1:
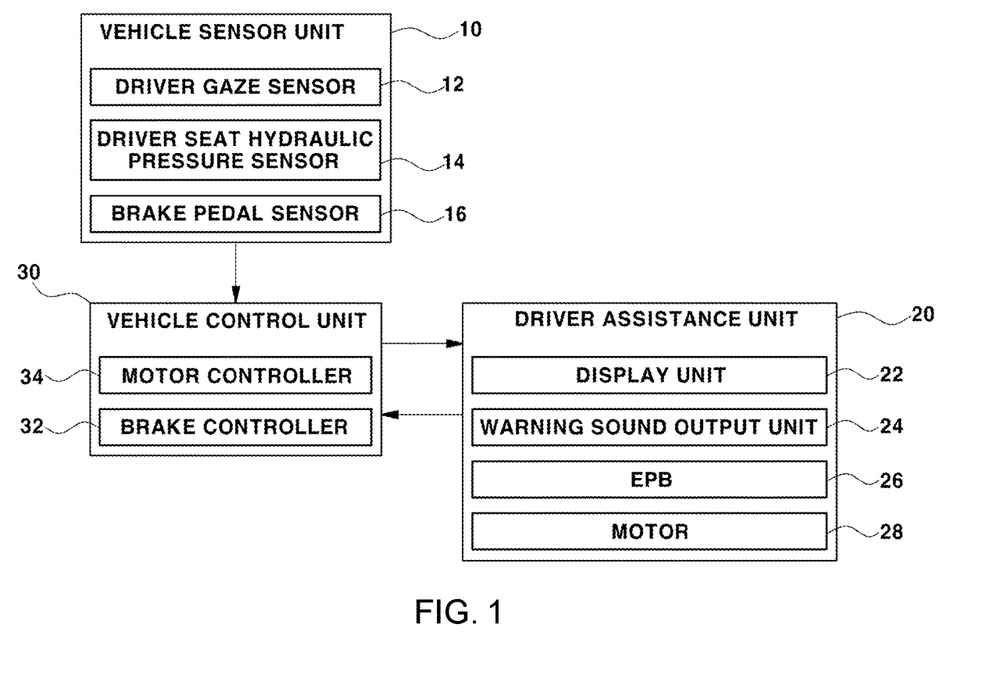
FIG. 1 is a diagram illustrating a configuration of a driver assistance system for vehicles according to various exemplary embodiments of the present disclosure.

As illustrated in FIG. 1, the driver assistance system includes a vehicle sensor unit 10, a driver assistance unit 20, and a vehicle control unit 30.

The vehicle sensor unit 10 may detect state data of a driver in a vehicle, and use a sensor already applied to the vehicle. The vehicle sensor unit 10 may include a driver gaze sensor 12, a driver seat hydraulic pressure sensor 14, and a brake pedal sensor 16.

The driver gaze sensor 12 is configured to detect a gaze of the driver accommodated in a driver seat. The driver gaze sensor 12 may include a camera, an infrared sensor, and the like, which are provided in a driver cluster (i.e., an instrument panel). The driver gaze sensor 12 transmits the driver gaze data (i.e., driver state data) detected in real time to the vehicle control unit 30.

The vehicle control unit 30 determines whether the driver looks ahead of the vehicle based on the driver state data obtained by the driver gaze sensor 12.

The driver seat hydraulic pressure sensor 14 is configured to detect a seat hydraulic pressure of the driver seat in real time. For example, the seat hydraulic pressure of the driver seat decreases when the driver lifts his or her buttocks from the driver seat. The driver seat hydraulic pressure sensor 14 transmits the driver seat hydraulic pressure data (i.e., driver state data) detected in real time to the vehicle control unit 30.

The vehicle control unit 30 determines whether the driver is normally accommodated on the driver seat based on the driver state data obtained by the driver seat hydraulic pressure sensor 14.

The brake pedal sensor 16 is configured to detect a pedal depression amount (i.e., stroke value) of the brake pedal in real time. The pedal depression amount of the brake pedal may be determined according to the force (i.e., pedal effort) of the driver depressing the brake pedal. The brake pedal sensor 16 transmits the pedal depression amount data (i.e., driver state data) detected in real time to the vehicle control unit 30.

The vehicle control unit 30 includes at least one of the controllers provided in the vehicle. For example, the vehicle control unit 30 may include a brake controller 32 configured to perform overall control of an in-vehicle brake system and a motor controller 34 configured to perform overall control of an in-vehicle motor system. The vehicle control unit 30 may further include another in-vehicle controller configured to control the operation of the driver assistance unit 20 based on the data obtained by the vehicle sensor unit 10.

When controlling the operation of the driver assistance unit 20, the vehicle control unit 30 may output and display a state of operation of the driver assistance unit 20 on a display unit in the vehicle. In the instant case, the display unit may be a display unit 22 included in the driver assistance unit 20.

The driver assistance unit 20 is operated to assist the driver when the driver carelessness about vehicle driving is detected when the vehicle stops while traveling, keeping the vehicle stopped.

After the vehicle stops while traveling, the driver assistance unit 20 may be operated to keep the vehicle stopped by warning the driver of a certain behavior or inducing a certain behavior of the driver. In addition, the driver assistance unit 20 may be operated so that the speed of the vehicle is forcibly maintained at "0" after the vehicle stops while traveling.

The driver assistance unit 20 may use devices already provided in the vehicle with no separate additional device.

The driver assistance unit 20 includes a display unit 22, a warning sound output unit 24, and an electric parking brake (EPB) 26.

The driver assistance unit 20 may further include a vehicle drive motor 28 configured to generate driving power of the vehicle. The driver assistance unit 20 may further include a transmission that converts power (i.e., torque) generated by a driving power source of the vehicle into rotation force, which is transmitted to wheels.

The display unit 22 is provided inside the vehicle to provide information visually, and the warning sound output unit 24 is provided inside the vehicle to provide information audibly. The electric parking brake 26 is a parking brake actuated by a motor.

When the vehicle stops while traveling, the vehicle control unit 30 identifies whether the driver is careless about vehicle driving based on the driver state data. When the driver carelessness is detected, the vehicle control unit 30 operates the driver assistance unit 20 to prevent the vehicle from traveling.

In the instant case, the vehicle control unit 30 classifies the driver carelessness into a plurality of levels (i.e., driver carelessness level) for determination based on the driver state data obtained by the vehicle sensor unit 10. The vehicle control unit 30 may identify the driver carelessness in stages by classifying the driver carelessness into a plurality of levels. In the exemplary embodiment of the present disclosure, the driver carelessness is classified into a total of three levels.

The vehicle control unit 30 executes a predetermined operation of the driver assistance unit 20 based on the level determined by the driver carelessness, preventing the vehicle from unintentionally driving forward by the driver.

The driver carelessness may refer to a state in which the driver does not concentrate on vehicle driving, namely, a state in which driving concentration is reduced.

Hereinafter, a driver assistance method using the driver assistance system of the present disclosure will be described in more detail with reference to FIG. 2, FIG. 3 and FIG. 4.

Figure 2:
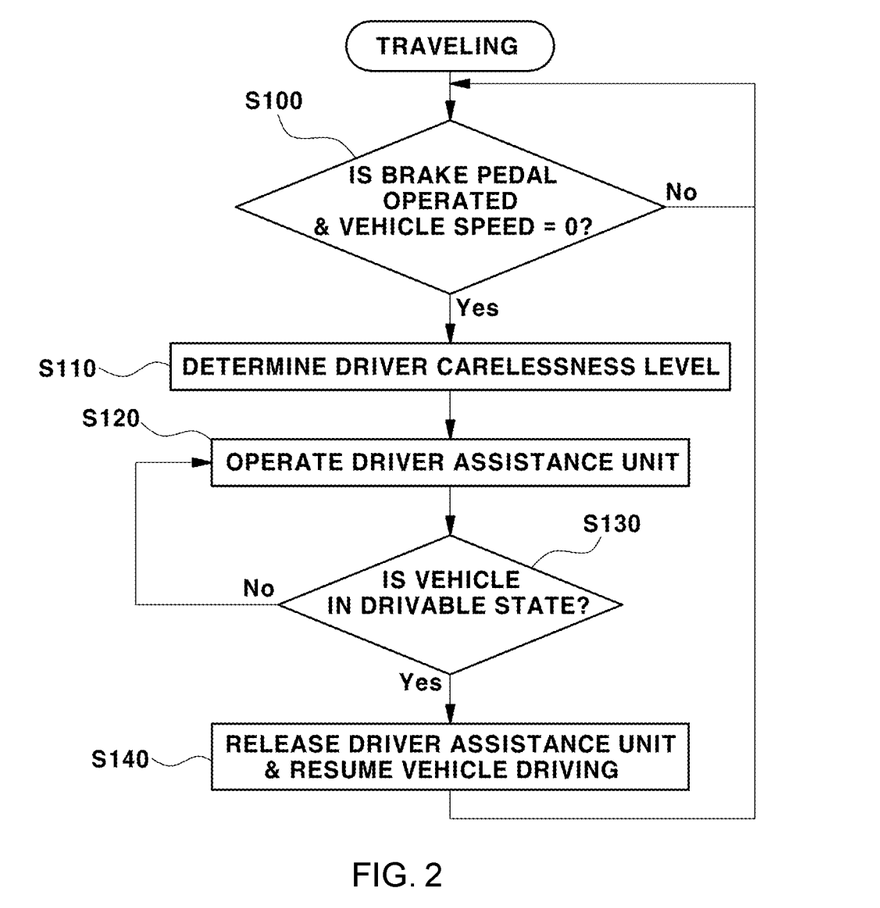
FIG. 2 is a flowchart illustrating a driver assistance method for vehicles according to various exemplary embodiments of the present disclosure.

As illustrated in FIG. 2, the vehicle control unit 30 determines whether the vehicle stops while traveling, based on whether the brake pedal is operated and the speed of the vehicle (S100). In the instant case, the vehicle control unit 30 may periodically determine whether the vehicle stops.

The vehicle control unit 30 determines whether the brake pedal is operated based on the pedal depression amount of the brake pedal obtained by the brake pedal sensor 16, and obtains vehicle speed data by the speed sensor mounted on the vehicle.

When it is determined that the brake pedal is in operation and the speed of the vehicle is "0", the vehicle control unit 30 determines that the vehicle stops while traveling. Specifically, when the pedal depression amount of the brake pedal is greater than a predetermined critical pedal depression amount, the gear shifting of the transmission is positioned in the drive rang, and the speed of the vehicle is "0", the vehicle control unit 30 determines that the vehicle stops while traveling.

When it is determined that the vehicle stops, the vehicle control unit 30 determines the driver carelessness level based on the driver state data (S110). Specifically, the vehicle control unit 30 determines the driver carelessness about vehicle driving as one of the first level, the second level, and the third level.

When it is determined that the driver does not look ahead of the vehicle based on the driver state data obtained by the driver gaze sensor 12 of the vehicle sensor unit 10, the vehicle control unit 30 determines the driver carelessness as the first level.

, when it is determined that, based on the driver state data obtained by the vehicle sensor unit 10, the driver does not look ahead of the vehicle, the driver is normally accommodated on the driver seat, and the driver depresses the brake pedal with a pedal effort for stopping the vehicle, the vehicle control unit 30 determines the driver carelessness as the first level.

In other words, there are provided a first condition in which the driver does not look ahead of the vehicle, a second condition in which the driver is not normally accommodated on the driver seat, and a third condition in which the driver does not depress the brake pedal with a pedal effort for stopping the vehicle. When the first condition is satisfied and the second and third conditions are not satisfied, the vehicle control unit 30 determines the driver carelessness as the first level.

The vehicle control unit 30 determines whether the driver is normally accommodated on the driver seat based on the driver state data obtained by the driver seat hydraulic pressure sensor 14, and determines whether the driver depresses the brake pedal with a pedal effort for stopping the vehicle based on the driver state data obtained by the brake pedal sensor 16.

When the driver is normally accommodated on the driver seat, the seat hydraulic pressure detected by the driver seat hydraulic pressure sensor 14 exceeds a predetermined critical hydraulic pressure. When the driver depresses the brake pedal to stop the vehicle, the pedal depression amount of the brake pedal exceeds a predetermined critical pedal depression amount. In other words, when the pedal depression amount of the brake pedal is higher than the critical pedal depression amount, the vehicle remains stopped.

Figure 3:
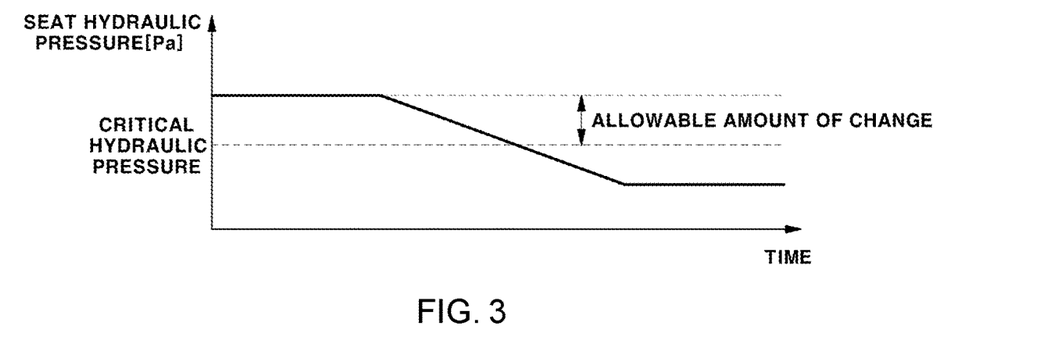
FIG. 3 is a graph illustrating an exemplary allowable change amount in seat hydraulic pressure obtained by a driver seat hydraulic pressure sensor applied to the present disclosure.
Figure 4:
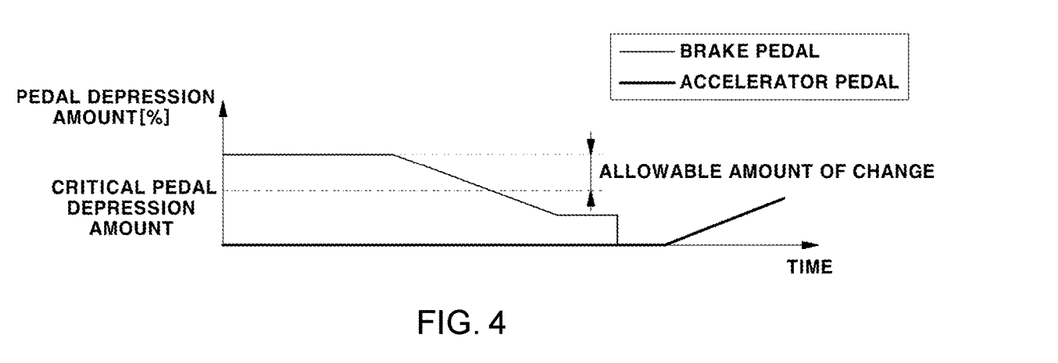
FIG. 4 is a graph illustrating an exemplary allowable change amount in pedal depression amount obtained by a brake pedal sensor applied to the present disclosure.

FIG. 3 is a graph illustrating an example of a seat hydraulic pressure Pa that varies in accordance with the state in which the driver is accommodated on the driver seat. FIG. 4 is a graph illustrating an example of a pedal depression amount (%) that varies in accordance with the force depressing the brake pedal and the accelerator pedal by the driver.

When the seat hydraulic pressure detected by the driver seat hydraulic pressure sensor 14 decreases to be less than or equal to the critical hydraulic pressure, the vehicle control unit 30 may determine that the driver detaches his or her buttocks from the driver seat. That is, when the driver seat hydraulic pressure is less than or equal to the critical hydraulic pressure, the vehicle control unit 30 determines that the driver is not normally accommodated on the driver seat.

When the pedal depression amount detected by the brake pedal sensor 16 decreases to be less than or equal to the critical pedal depression amount, the vehicle control unit 30 may determine that the driver releases the depressed brake pedal. For example, the driver may accidentally release the depressed brake pedal while the driver is careless about vehicle driving.

When it is determined that one of the second and third conditions is fulfilled and the first condition is fulfilled based on the driver state data, the vehicle control unit 30 determines the driver carelessness as the second level.

When it is determined that the first and second conditions are fulfilled and the third condition is not fulfilled, the vehicle control unit 30 determines the driver carelessness as the second level. The vehicle control unit 30 may determine the driver carelessness as the second level even when it is determined that the first and third conditions are fulfilled and the second condition is not fulfilled.

When it is determined that all of the first, second, and third conditions are fulfilled based on the driver state data, the vehicle control unit 30 determines the driver carelessness as the third level.

The vehicle control unit 30 determines the level (i.e., driver carelessness level) according to the driver carelessness, and then operates the driver assistance unit 20 (S120). In the instant case, the driver assistance unit 20 executes an operation determined by the driver carelessness level.

When the driver carelessness is determined as the first level, namely, when the driver carelessness level is the first level, the vehicle control unit 30 visually warns of the driver carelessness through the display unit 22 provided inside the vehicle. For example, the display unit 22 on the cluster provided in front of the driver seat may output and display a phrase "driver forward gaze".

When the driver carelessness is determined as the second level, namely, when the driver carelessness level is the second level, the vehicle control unit 30 operates the display unit 22 and the warning sound output unit 24 to warn of the driver carelessness. That is, the vehicle control unit 30 visually warns of the driver carelessness through the display unit 22, while audibly warning of the driver carelessness through the warning sound output unit 24. For example, the display unit 22 may output and display a phrase "correct driver sitting posture".

When the driver carelessness is determined as the third level, namely, when the driver carelessness level is the third level, the vehicle control unit 30 may operate the electric parking brake 26. The vehicle control unit 30 may also operate the display unit 22 and the warning sound output unit 24 together when the electric parking brake 26 is operated.

When the driver carelessness level is the third level, the vehicle control unit 30 may operate the electric parking brake 26, allowing the vehicle to remain stopped even when the depressed brake pedal is released.

When the driver carelessness is determined as the third level, the vehicle control unit 30 may block transmission of creep torque from the driving power source to the wheels of the vehicle, without operating the electric parking brake 26.

The creep torque is a torque generated by the driving power source for the vehicle to immediately drive forward even when the depressed brake pedal is released and the accelerator pedal is not depressed in the state in which the gear shifting of the transmission is positioned in the drive range. In other words, the creep torque is a torque generated by the driving power source when the vehicle stops while traveling. The driving power source may include an engine and a motor 28.

Accordingly, the vehicle control unit 30 may shift the gear shifting of the transmission to a neutral range (N range) to prevent the transmission of the creep torque to the wheels of the vehicle when the depressed brake pedal is released. When the gear shifting of the transmission is positioned in the neutral range, the creep torque from the driving power source is not transmitted to the wheels.

The vehicle control unit 30 may control the creep torque to be "0" by stopping the operation of the vehicle drive motor 28 to prevent the transmission of the creep torque to the wheels of the vehicle when the depressed brake pedal is released. In the instant case, the vehicle is an electric vehicle using only the motor 28 as a driving power source thereof. In the electric vehicle, even when the brake pedal is released while the gear shifting of the transmission is positioned in the drive range, it is possible to prevent the transmission of the creep torque to the wheels by controlling the output torque (i.e., creep torque) of the motor 28 to be "0".

When the driver carelessness is determined as the third level, the vehicle control unit 30 may control the torque output from the motor 28 so that the speed of the vehicle is "0", without operating the electric parking brake 26.

For example, when the brake pedal is released while the gear shifting of the transmission is positioned in the drive range when the vehicle is located on a slope, the vehicle is reversed. In the instant case, the vehicle control unit 30 may control the speed of the vehicle to be "0" by controlling the output torque of the motor 28.

The vehicle control unit 30 may also operate the display unit 22 and the warning sound output unit 24 together when the electric parking brake 26 or the motor 28 is operated for controlling the speed of the vehicle. The vehicle control unit 30 may output and display information related to the state of operation of the driver assistance unit 20, such as the electric parking brake 26 and the motor 28, on the display unit 22.

Meanwhile, the vehicle control unit 30 determines whether the vehicle is in a drivable state while the driver assistance unit 20 is in operation (S130). The vehicle control unit 30 determines whether the vehicle is drivable based on the data obtained by the driver seat hydraulic pressure sensor 14, the driver gaze sensor 12, and the accelerator pedal sensor.

The vehicle control unit 30 determines that the vehicle is in a drivable state when the seat hydraulic pressure obtained by the driver seat hydraulic pressure sensor 14 is equal to or greater than a predetermined critical hydraulic pressure, when it is determined that the driver looks ahead based on the data obtained by the driver gaze sensor 12, and when the pedal depression amount of the accelerator pedal obtained by the accelerator pedal sensor is greater than a predetermined critical pedal depression amount.

In the instant case, the vehicle control unit 30 releases the operation of the driver assistance unit 20 and resumes the driving of the vehicle to resume the driving of the vehicle according to the pedal depression amount of the accelerator pedal (S140).

Furthermore, the critical pedal depression amount of the accelerator pedal may be determined to be "0" or a value close to "0".

As is apparent from the above description, the present disclosure can prevent the creep driving and sudden start of the vehicle caused by the driver mistake after the vehicle stops, preventing an accident.

The present disclosure is not limited to the above-mentioned effects, and other effects of the present disclosure will be clearly understood by those skilled in the art to which an exemplary embodiment of the present disclosure pertains from the above description.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driver assistance system for a vehicle, the driver assistance system comprising:
    a vehicle sensor unit configured to detect driver state data;
    a driver assistance unit operated to assist a driver when driver carelessness about vehicle driving is detected when the vehicle stops while traveling; and
    a control unit configured to identify whether the driver is careless based on the driver state data when the vehicle stops while traveling, and to operate the driver assistance unit when the driver carelessness is detected, preventing the vehicle from driving,
    wherein the control unit is further configured to classify the driver carelessness into a plurality of levels according to the driver state data, and wherein the vehicle sensor unit includes:
   a driver gaze sensor configured to detect a gaze of the driver;
   a driver seat hydraulic pressure sensor configured to detect a seat hydraulic pressure of a driver seat; and
   a brake pedal sensor configured to detect a pedal depression amount of a brake pedal.

2. The driver assistance system of claim 1,
wherein the plurality of levels includes a first level, and
wherein, when the control unit concludes that the driver does not look ahead according to the driver state data obtained by the driver gaze sensor, the control unit is further configured to determine the driver carelessness as the first level.

3. The driver assistance system of claim 2,
wherein the plurality of levels further includes a second level, and
wherein the control unit is further configured to determine the driver carelessness as the second level when the control unit concludes that the driver does not look ahead, and when the seat hydraulic pressure obtained by the driver seat hydraulic pressure sensor is less than or equal to a predetermined hydraulic pressure, or when the pedal depression amount of the brake pedal obtained by the brake pedal sensor is less than or equal to a predetermined pedal depression amount.

4. The driver assistance system of claim 3,
wherein the plurality of levels further includes a third level, and
wherein the control unit is further configured to determine the driver carelessness as the third level when the control unit concludes that the driver does not look ahead, and when the seat hydraulic pressure is less than or equal to the predetermined hydraulic pressure, and when the pedal depression amount of the brake pedal is less than or equal to the predetermined pedal depression amount.

5. The driver assistance system of claim 2, wherein, when the driver carelessness is determined as the first level, the control unit is further configured to visually warn of the driver carelessness through a display unit provided in the driver assistance unit.

6. The driver assistance system of claim 3, wherein, when the driver carelessness is determined as the second level, the control unit is further configured to visually warn of the driver carelessness through a display unit provided in the driver assistance unit, while audibly warning of the driver carelessness through a warning sound output unit provided in the driver assistance unit.

7. The driver assistance system of claim 4, wherein, when the driver carelessness is determined as the third level, the control unit is further configured to operate an electric parking brake provided in the driver assistance unit.

8. The driver assistance system of claim 4, wherein the driver carelessness is determined as the third level, the control unit is further configured to shift a gear shifting of a transmission, provided in the driver assistance unit, to a neutral range.

9. The driver assistance system of claim 4, wherein, when the driver carelessness is determined as the third level, the control unit is further configured to control a vehicle drive motor provided in the driver assistance unit to have a torque of "0", in which case the vehicle is an electric vehicle using only the vehicle drive motor as a driving power source thereof.

10. The driver assistance system of claim 4, wherein, when the driver carelessness is determined as the third level, the control unit is further configured to visually and audibly warn of the driver carelessness through a display unit and a warning sound output unit provided in the driver assistance unit.

11. The driver assistance system of claim 1, wherein, when a vehicle speed is "0", a pedal depression amount of a brake pedal of the vehicle is greater than a predetermined pedal depression amount, and a gear shifting of a transmission is positioned in a drive range, the control unit is further configured to determine that the vehicle stops while traveling.

12. The driver assistance system of claim 1, wherein, the control unit is further configured to release the operation of the driver assistance unit by determining that the vehicle is in a drivable state when the control unit concludes that the seat hydraulic pressure is maintained to be equal to or greater than a predetermined hydraulic pressure while the driver assistance unit is in operation, a pedal depression amount of an accelerator pedal is greater than a predetermined pedal depression amount of the accelerator pedal, and the driver looks ahead.

13. A method of controlling a driver assistance system of a vehicle, the method comprising:
   determining, by a control unit of the driver assistance system, whether the vehicle stops while traveling, based on whether a brake pedal of the vehicle is operated and a speed of the vehicle;
   determining, by the control unit, a driver carelessness level based on driver state data detected by a vehicle sensor, when the control unit concludes that the vehicle stops; and
   determining, by the control unit, the driver carelessness level according to driver carelessness, and then operating the driver assistance unit of the driver assistance system according to the determined driver carelessness level,
   wherein the control unit is configured to classify the driver carelessness into a plurality of levels according to the driver state data, and
   wherein the vehicle sensor unit includes:
      a driver gaze sensor configured to detect a gaze of the driver;
      a driver seat hydraulic pressure sensor configured to detect a seat hydraulic pressure of a driver seat; and
      a brake pedal sensor configured to detect a pedal depression amount of a brake pedal.

14. The method of claim 13, wherein the control unit is further configured to classify the driver carelessness into a plurality of levels according to the driver state data.

15. The method of claim 14,
wherein the plurality of levels includes a first level, and
wherein, when the control unit concludes that a driver does not look ahead according to the driver state data obtained by the driver gaze sensor of the driver assistance system, the control unit is further configured to determine the driver carelessness as the first level and to visually warn of the driver carelessness through a display unit provided in the driver assistance unit.

16. The method of claim 15,
wherein the plurality of levels further includes a second level, and
wherein the control unit is further configured to determine the driver carelessness as the second level when the control unit concludes that the driver does not look ahead, and when the seat hydraulic pressure obtained by the driver seat hydraulic pressure sensor of the driver assistance system is less than or equal to a predetermined hydraulic pressure, or when the pedal depression amount of the brake pedal obtained by the brake pedal sensor of the driver assistance system is less than or equal to a predetermined pedal depression amount, and configured to visually warn of the driver carelessness through the display unit provided in the driver assistance unit, while audibly warning of the driver carelessness through a warning sound output unit provided in the driver assistance unit.

17. The method of claim 16,
wherein the plurality of levels further includes a third level, and
wherein the control unit is further configured to determine the driver carelessness as the third level when the control unit concludes that the driver does not look ahead, and when the seat hydraulic pressure is less than or equal to the predetermined hydraulic pressure, and when the pedal depression amount of the brake pedal is less than or equal to the predetermined pedal depression amount, and configured to operate an electric parking brake provided in the driver assistance unit, to shift a gear shifting of a transmission, provided in the driver assistance unit, to a neutral range, to control a vehicle drive motor provided in the driver assistance unit to have a torque of "0", in which case the vehicle is an electric vehicle using only the vehicle drive motor as a driving power source thereof, or to visually and audibly warn of the driver carelessness through the display unit and the warning sound output unit provided in the driver assistance unit.

18. The method of claim 13, further including:
determining, by the control unit, whether the vehicle is in a drivable state while the driver assistance unit is in operation; and
releasing, by the control unit, the operating of the driver assistance unit and resuming driving of the vehicle to resume the driving of the vehicle according to an pedal depression amount of an accelerator pedal.

\* \* \* \* \*